(12) United States Patent
Baker-Harvey

(10) Patent No.: US 6,385,638 B1
(45) Date of Patent: May 7, 2002

(54) PROCESSOR RESOURCE DISTRIBUTOR AND METHOD

(75) Inventor: Miche Baker-Harvey, Seattle, WA (US)

(73) Assignee: Equator Technologies, Inc., Seattle, WA (US)

( * ) Notice: Subject to any disclaimer, the term of this patent is extended or adjusted under 35 U.S.C. 154(b) by 0 days.

(21) Appl. No.: 08/923,173

(22) Filed: Sep. 4, 1997

(51) Int. Cl.$^7$ ................................................. G06F 9/00
(52) U.S. Cl. ...................................... 709/107; 709/102
(58) Field of Search ............................ 709/1, 100, 102, 709/103, 104, 105, 106, 107, 101; 710/113, 244

(56) References Cited

U.S. PATENT DOCUMENTS

| | | | | |
|---|---|---|---|---|
| 4,736,318 A | * | 4/1988 | Delyani et al. | ............. 364/200 |
| 5,247,677 A | * | 9/1993 | Welland et al. | |
| 5,404,516 A | * | 4/1995 | Georgiades et al. | |
| 5,469,571 A | * | 11/1995 | Bunnell | |
| 5,487,170 A | * | 1/1996 | Bass et al. | ................... 710/244 |

FOREIGN PATENT DOCUMENTS

| | | | | |
|---|---|---|---|---|
| EP | 0 194 533 | | 9/1986 | ............. G06F/9/46 |
| GB | 2304211 | | 12/1997 | ............. G06F/9/46 |

OTHER PUBLICATIONS

Scheduling techniques for Real_time Applications Consisting of Periodic Tasks Sets, Hardeep Singh, Texas Instruments, 1994 IEEE.*

Real_Time Mach: Toward a Predictable Real–Time Systems, Hideyuki Tokuda et al., Scheool of Computer Science Carnegie Melon University, 1989.*

Scheduling Algorithms and Operating Syustems Support for Real_time Systems, Krith Ramamritham, and John A. Stankovic, Proceeding of IEEE, vol. 82, No. 1, Jan. 1994.*

Implementation and Evaluation of a Time–Driven Scheduling Processor, James W. Wendorf, Philips Laboratories, 1988 IEEE.*

A Rate–Based Exec;ution Abstraction for Multimedia Computing. In Proceedings of the Fifth International Workshop on Network and Operating Systems Support for Digital Audio and Video, K. Jeffay and D. Bennett. Apr. 1995.

Modular Real–Time Resource Management in the Rialto Operating System. In Proceedings of the Fifth International Workshop on Network and Operating Systems Support for Digital Audio and Video, M.B. Jones, J.S. Barrerra III, P.J. Leach, R.P. Draves.

An Overview of the Rialto Real–Time Architecture, MSR–TR–96–13, M.B. Jones, J.S. Barrerra III, A. Forin, P.J. Leach, D. Rosu, M–C. Rosu, Jul. 1996.

Processor Capacity Reserves: Operating System Support for Multimedia Applications. In Proceedings of the IEEE International Confernece on Multimedia Computing and Systems, C.W. Mercer, S. Savage, and H. Tokuda, May 1994.

(List continued on next page.)

Primary Examiner—Majid A. Banankhah
(74) Attorney, Agent, or Firm—Graybeal Jackson Haley LLP

(57) ABSTRACT

A device and method for distributing time available on a processor among two or more alternative tasks or threads and scheduling their execution. Each of the tasks specifies multiple levels of time usage on the process under which it can operate, including a best quality of service which uses the most time and a minimal quality of service which uses the least time. The invented system and method guarantees that each task will always be able to run at least its minimal quality of service and includes methods for obtaining optimal quality of service from all of the tasks.

51 Claims, 4 Drawing Sheets

(SCHEDULING COMPONENTS IN THE PROCESSOR RESOURCE DISTRIBUTOR)

OTHER PUBLICATIONS

Applying Hard Real–Time Technology to Multimedia Systems. In Proceedings of the Workshop on the Role of Real–Time in Multimedia/Interactive Computing Systems, C.W. Mercer, R. Rajkumar, and H. Tokuda, Nov. 1993.

A Scheduler for Multimedia Applications. Technical Report CSL–TR–96–697, Computer SYstems Laboratory, Stanford University, J. Nieh and M.S. Lam, Jun. 1996.

A Periodic Task Scheduling for Hard–Real–Time Systems. In *The Journal of Real–Time Systems*, vol. 1, No. 1, pp. 27–60, B. Sprunt, L. Sha, and J. Lehoczky, 1989.

CPU Reservations and Time Constraints: Efficient, Predictable Scheduling of Independent Activities, Technical Report MSR–TR–97–19, Michael B. Jones, Daniela Rosu, Marcel–Tatalin Rosu, Oct. 1997.

Nakajima, T. et al "A continuous media application supporting dynamic QOS control on Real–Time Mach" Proceedings ACM Multimedia '94, pp. 289–297 (See: p. 290, left–hand column, line 19) (Also See: p 291, left–hand column, line 55).

Kaneko, H. et al "Integrated scheduling multimedia and hard real–time tasks" Symposium (Cat No. 96CB36024), Proceedings 17th IEEE Real–Time Symposium, Los Alamitos, CA 4–6 Dec. 1996, pp. 206–217 (See: p. 206, right–hand column, line 18) (See Also: p. 210, left–hand column, line 18) (See Also: p. 212 right hand column, line 5) (See Also p. 213, left–hand column, line 12).

* cited by examiner (SCHEDULING COMPONENTS IN THE PROCESSOR RESOURCE DISTRIBUTOR)

Fig. 2. A Schedule over 66 milliseconds for a Modem, 3D Graphics and MPEG decoding task. Time in milliseconds; vertical bars show Period Deadlines for each task.

(FLOW OF THE RESOURCE MANAGER)

(SCHEDULER OVERVIEW)

PROCESSOR RESOURCE DISTRIBUTOR AND METHOD

BACKGROUND

Scheduling requirements for a processor with soft real time requirements have been addressed by several prior art systems, including SMART, Rialto, and Processor Capacity Reserves.

The SMART scheduler, designed at Stanford University, provides support for simultaneous execution of conventional and soft real time applications. Interactive applications get good response. It uses a modified Best Effort scheduler, where in underload all deadlines are met, and in overload, task priorities are used to gracefully degrade performance by denying service to low priority tasks. It uses a notion of virtual time which is advanced for a task as it executes.

The Rialto scheduler, designed at Microsoft Research, supports simultaneous execution of both conventional and soft real time applications in a distributed environment. Applications in Rialto are independently authored, so modularity of timing and scheduling is needed for tasks to be able to reason about their scheduling needs. Rialto uses a minimum laxity scheduler which is better than Earliest Deadline First (EDF) for distributed applications, where there is no concept of a deadline for components which have been accessed in mid-pipeline. Rialto uses a combination of begin-constraint/end-constraint mechanisms, and a reservation system to limit utilization, schedule, and manage overload conditions: They "proactively avoid most load shedding situations".

The Processor Capacity Reserves system developed at CMU also supports simultaneous execution of both conventional and real time activities. Applications pre-reserve the times that they require, and the system ensures both that tasks do not overrun their reservations and that reservations do not exceed the capacity of the system. Reserves are given in terms of an amount of time to be used in each period, and scheduling is EDF(earliest deadline first). Reserves can be passed across process boundaries, which supports the distribution of tasks. The Processor Capacity Reserves system has an explicit separation of scheduling and a QOS manager.

SUMMARY OF THE INVENTION

The invented processor resource distributor allocates time on a processor to numerous tasks. It consists of three components. The first component, called the Resource Manager, determines which tasks will be granted what amounts of time. The second, called the Scheduler, gives the time to the tasks in a way that each gets what has been allocated to it. The third component, called the Policy Box, interacts with users and the Resource Manager when there is insufficient time to meet the requests of all tasks.

The processor is asked to run a set of tasks, such as a set of tasks that provide the appearance of a set of devices, perhaps to a host, or perhaps directly to a user. The host machine may be a DOS box, a computer running Windows, or something else. Alternatively, the processor could be in a set-top box, in which case there is no host. A PC user might be presented with support for audio and video, modem, and graphics devices.

The set of tasks supported in any one system may be static (such as is the case in a DOS box), or it may be dynamic (such as with Windows, or with a set-top box in the presence of Java applets). These tasks must share the processor in real time to present the appearance of simultaneously running devices.

The processor resource distributor is responsible for admitting and scheduling the tasks: It determines whether a task can run, when it can run, and how much of the available time it can consume (how long it can run in each session). It manages the use of processor time such that the user continues to believe that a set of real physical devices is supported; the fact that numerous devices are simulated is not visible.

In this environment, we have soft real time requirements. Although tasks have deadlines, if the deadlines are missed the results are unfortunate but not catastrophic. In this limited environment, we may not have conventional workstation or timesharing tasks, although a set top environment may have these to a limited extent. Nearly all tasks have a period naturally associated with them. Aperiodic tasks are usually associated with infrequently executed commands.

CONTRASTS WITH PRIOR ART SYSTEMS

Admission control is guaranteed. In our system, when a task is granted admission, it is guaranteed to get at least its own defined minimum times until it is terminated.

Resource allocation is a step function. Other systems do resource allocation as a smooth function. In other systems, priorities are used in overload to "gracefully degrade" the performance of the running tasks. The problem with this approach is that none of our tasks will "gracefully degrade" if their utilizations are changed slightly. Rather, there are clear steps of quality of service that require corresponding steps in resource allocation. An allocation not at one of these steps results either in wasting resources for a lower level of quality, or missing the deadline for a higher level.

Minimal recalculation for admission control and the grant set. We recompute the scheduling information when and only when an event has occurred that affects the schedule. Systems like Rialto which use a begin constraint/end constraint pair recompute the feasibility of the schedule for every task on every period.

We do not recompute the schedule or attempt to make policy decisions about admittance when the system is in overload, or when a deadline is about to be missed. This is the approach of systems like Rialto. It has the disadvantage that a deadline may have already been missed by the time a scheduling decision is being made. In our system, deadlines are never missed.

We support quiescent tasks. These tasks are guaranteed admission when they want to run, without the cost of recomputing admissions control, but they do not consume any resources until they leave the quiescent state. Some systems would require these types of tasks to make a capacity reservation for the full amount even when it is not being used; this results in wasted resources. Other systems require the task to arbitrate when it actually wants to execute, which may result in other tasks which have already gained admission being terminated.

Global policy decisions on which task will shed load or miss a deadline. Other systems may do global decision making when a transient overload is detected, but at that point some task has already missed a deadline. Effectively, it has been asked to shed load. And the "selection process" for this task is nearly random: it is whatever task happens to run next when the overload occurs.

One embodiment of the invention is a method for limiting admissions of tasks to be performed on a processor, each of the tasks having more than one level of use of time, including both a high level which provides a high quality of performance and a low level which provides a low quality of performance. Tasks are admitted for processing so long as the sum of the lowest use levels for the tasks does not exceed the total time available on the processor. If a task requests processing but the time is unavailable on the processor (the sum of the lowest use levels of the already admitted tasks is too great to admit the new task), the new task is excluded. However, a different task with a lower lowest use level may be admitted if the use level is low enough to fit within the time available.

Once tasks are admitted, execution is commenced. If one of the tasks temporarily ceases to require execution thereby making more time available on the processor, other tasks which had been executing at less than their highest use level will switch their execution to a higher use level to make use of the time which has been freed. Also, when a task temporarily ceases to require execution, making unused time available on the processor, an important aspect of the invented method is that the method will not allow an additional task to be admitted to take advantage of the available time unless the sum of the lowest use levels of all tasks, including the task which has temporarily ceased to require execution, allows time for a newly admitted task. That is, the mere fact that enough time is available on the processor when one or more of the tasks ceases to require execution is not sufficient to allow another task to make use of the unused time. Instead, one of the previously admitted tasks must terminate such that the sum of the lowest use levels of the remaining admitted tasks is small enough that the new task can be admitted without exceeding the time available on the processor.

In another aspect of the invention, the invented method presents an application programming interface to a plurality of applications. Each application specifies to the processor resource distributor two or more functions for calling the application, each function requiring a different level of use of the processor. In this method, the processor resource distributor calls each of the tasks with one of its functions, selecting the function to use for calling the task based on the time available on the processor. As the applications present their calling functions to the processor, each application presents a list of call back functions and, associated with each call back function, a cycle duration for division of real time and, for each cycle duration, specification of a portion of each cycle to be used by the task when called with that function. The information consists of the cycle duration and the portion of each cycle to be used. This information is used by the processor resource distributor to determine a schedule for allocating processor time to each of the applications.

Another aspect of the invention comprises a method for shifting time from one task to another. If a first task which has at least two levels of use of time is operating at its higher level of use and a second task, for a particular period, requires more time than has been allocated to the task, the invention includes a method for shifting the first task to a lower use level to make time available for use by the second task. Additionally, instead of shifting time available from one task to another, the second task can report to the processor resource distributor that it did not have enough time to finish processing in a particular period or cycle and it will be given any time that comes available when other tasks finish early. If insufficient time comes available for the time to complete prior to the beginning of the next cycle or period, this fact is reported to the resource manager and the resource manager can call the task in the next cycle with a call back function specifying a lower use level.

DETAILED DESCRIPTION

Figure 1:
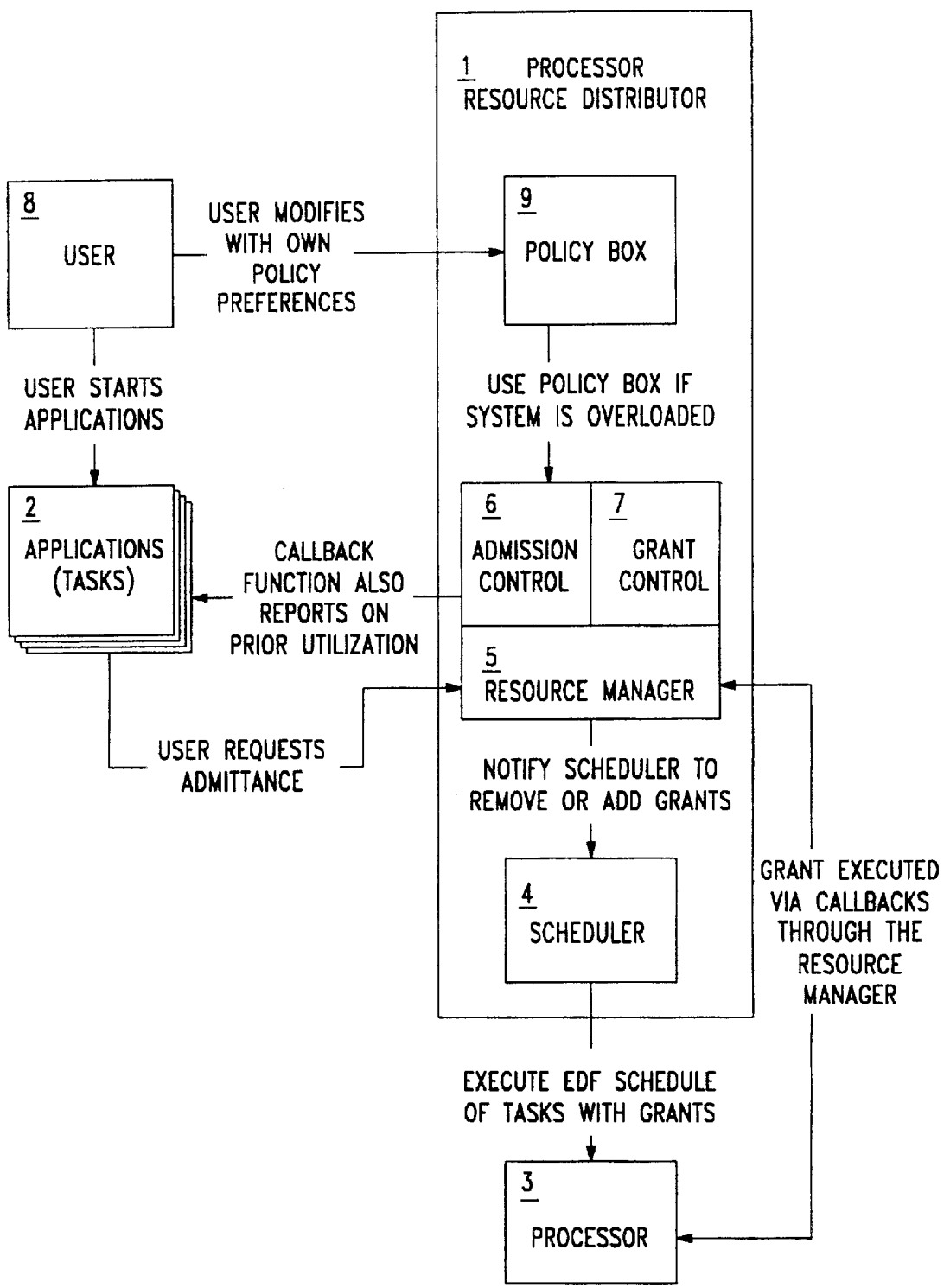
FIG. 1 is a block diagram showing the scheduling components of the processor resource distributor.

First Principles. As shown in FIG. 1, the processor resource distributor 1 adheres to the following three first principles.
1. Once a task 2 has been successfully started by the user, then from the user's perspective, the task must continue until it terminates naturally, or the user terminates it.

The user initiates a task through some command line, dialogue, button or whatever (e.g. hitting the play button on the CD player). Once the task has begun (e.g. the sound track begins to emanate from the speakers), it will continue until it terminates (the end of the CD is reached) or the user terminates it (by hitting the "stop" button on the CD player). The task(s) responsible for this functionality on the processor 3 may not run continuously while the CD is playing (in fact, ideally, they will not), but the user will not be able to detect this from the sound of the speakers.

Note that this principle is not met by any system that has the potential to terminate a running task in the presence of transient overload.

Figure 2:
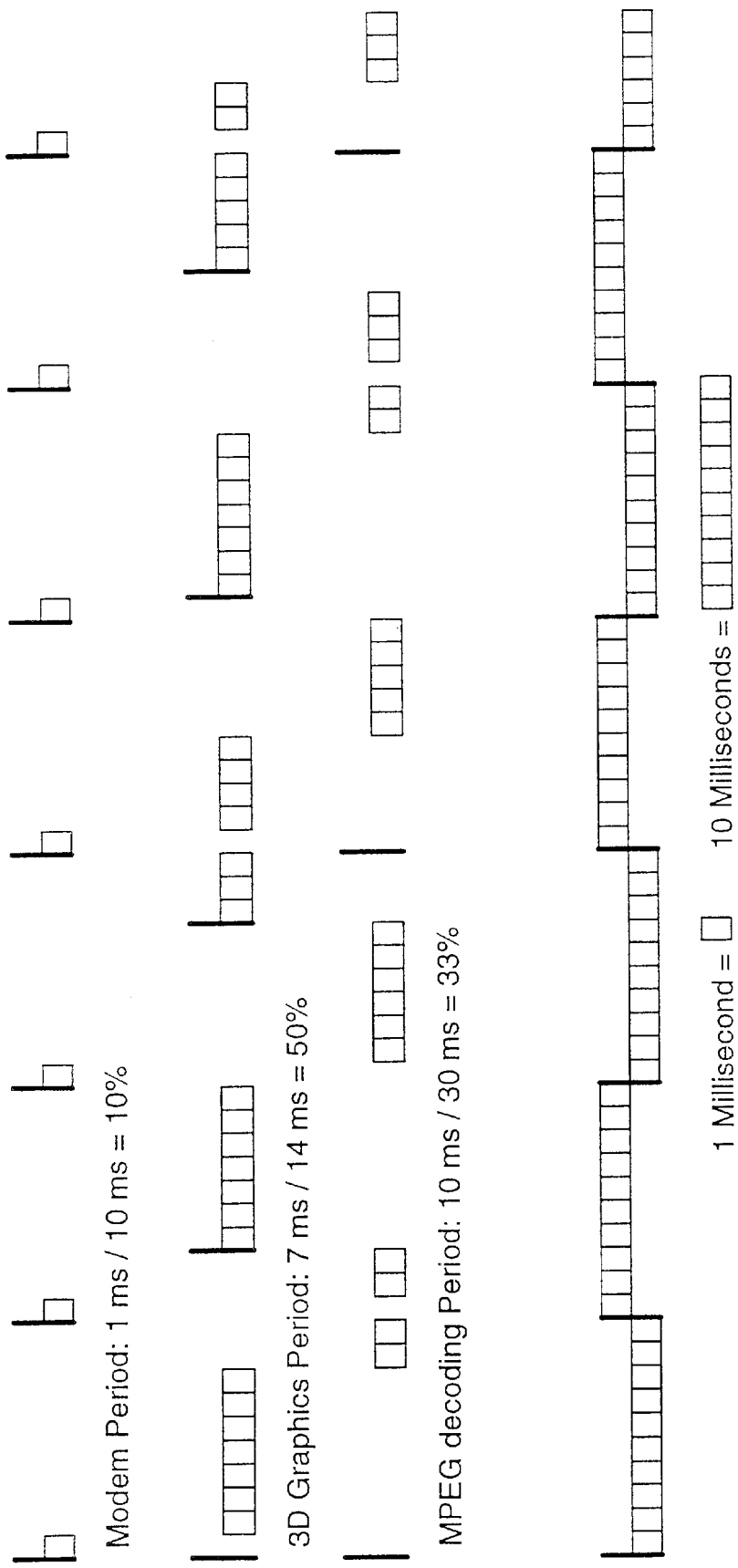
FIG. 2 shows a sample schedule as implemented by the Scheduler of the processor resource distributor for three tasks.

This is not a guarantee that the task will run without preemption, but only that it will be granted sufficient time sufficiently often to be able to maintain the appearance of continuous functionality. The processor distributor 1 will allocate (nearly) 100% of the time available in the processor 3 as long as there are tasks 2 ready to use the time.
2. If a task 2 is ready to run, and some portion of a recurring timing cycle ("period" in FIG. 2) is unused, that amount of time will be made available to the ready-to-run task. That is, if the processor is partly idle, and a task wants more processor time, it will be granted more time. This means that one task need not reserve excess processor time for itself. If another task requests some time that an earlier task has reserved but is not using, the later task will be given the time.
3. Quality of service modifications should be made with reference to the requirements of the user and such policy decisions should be made with an understanding of the whole system.

If the system is overloaded because too much of the processor's time is required by the task set, some task must either be terminated or asked to shed load by providing a lower quality of service. The decision as to which task(s) should be asked to shed load, and how much they should be asked to degrade their service, should be made based on user preferences. There must be some global (system-wide) understanding of how the task set is meeting the user's needs, and quality of service decisions should not be made Oust) with the understanding of the needs of a single task.

Design Principles of the Processor Resource Distributor

There are a couple of design choices which are important for the design of the processor resource distributor 1. Separation of scheduling and admission control We separate out deciding which tasks to run (the Resource Manager 5), and actually running them (the Scheduler 4).

The process of deciding which tasks to run (and how well to run them) which is performed by the Resource Manager 5 is further broken into two components. The first, admission control 6, is the process by which we determine whether a task can be admitted to the system. An admitted task is guaranteed its minimum amount of processor time. The application writer has the option of specifying a zero minimum. The second, grant control 7, determines how much processor time will be given to each task. The grant consists of a period of time and an amount of the period which can be consumed. For instance, a grant might allocate 10 ms in a 30 ms period. The grant is a guarantee to the task 2 that this much time will be allocated to the task in each named period.

The process of actually ordering the tasks to be run, and of guaranteeing that the time allocations which have been granted are delivered, is performed by the scheduler 4. The scheduler makes no policy decisions: it simply cycles through the set of tasks which has been established by the grant control process 7.

User Controlled Scheduling Policy

We separate the policy wherein we decide which tasks should be executed and the means we use for doing the selection. Simliarly, we separate the policy wherein we decide what level of quality of service a particular task should provide, and the means we use for selecting the quality of service levels.

The user (or host) 8 controls which tasks are selected for scheduling, and what level of quality of service each task is asked to provide. The Resource Manager 5 has hooks for accessing the user-driven scheduling policy information in the policy box 9 when scheduling policy decisions must be made.

The processor resource distributor 1 is designed so luck and timing play no role in determining what set of tasks run, or in how well they run. Allocation policy decisions are always made explicitly; this contrasts with systems that effectively make a new scheduling decision for every period in a periodic task's lifetime. We only make policy allocation decisions when an event that is significant to resource distribution has occurred, such as when a new task starts or stops, or a task needs to modify its utilization pattern.

In the processor resource distributor 1, policy decisions are made by the Resource Manager 5, with reference to a Policy Box 9. The Policy Box is preset by the system designers, but may be modified by the user 8 to match their personal preferences. For instance, by default, video processing should degrade before audio processing, but a deaf user might want to reverse that.

Overview of Time Distribution on the Processor

The functions of the resource distributor 1 are divided into three main components, a Scheduler 4, a Resource Manager 5, and a Policy Box 9.

The Resource Manager 5 is responsible for admissions control 6, grant setting 7, and negotiating time utilization amongst multiple tasks on behalf of the user.

The Scheduler 4 is responsible for implementing a schedule that honors the allocations made by the Resource Manager 5, enforcing the time allocations, and notifying the Resource Manager 5 of actual utilizations.

When a task 2 needs to be started on the processor 3, a request will be made to the Resource Manager 5 for time on the processor. A request for processor cycles is given in terms of a (repeating) period over which processor time is required, and the amount of time needed in each period. For instance, an MPEG decoder task might need 10 milliseconds of processor time each 30 millisecond period. See FIG. 2.

If there is sufficient excess capacity for the time requested, the Resource Manager 5 will grant the request made by the task 2. The task will be added to the set being scheduled, and will stay there until the task is terminated by the user or some other external event.

If an overload condition occurs, some special action must be taken. In this case, the Resource Manager 5 refers to the Policy Box 9 to determine which task should be asked to shed some load, providing a lower quality of service. There is no implication that the task that made the request that cannot be met will be the one to be asked to shed load. Rather, an independent ordering of tasks and their quality of services is provided by the Policy Box to aid in this decision.

An implication of the fact that we do strict admissions control is that the Scheduler 4 is guaranteed to be asked to schedule only a set of tasks which are known to be schedulable. This means that we can (and do) use a simple scheduling policy like Earliest Deadline First (EDF). EDF has been proven to effectively schedule any set of tasks which is theoretically schedulable, within certain constraints. The constraints include preemptability, and lack of synchronization between the tasks. A task with a smaller period may run several times during a single period for a longer-running task. This requires that the longer running task be preemptable. Scheduling cannot be guaranteed unless the tasks can accept their utilization at any point in a period.—This implies that periodic tasks cannot wait on synchronization within their period. The periodic tasks of a typical set of tasks for the processor resource distributor, controlling video, audio, and communications, meet these requirements.

How We Make This Work

In order to meet the goal of not terminating a running a task, we must reserve adequate time for the task whether it is using its time. When the system is overloaded, we need a way to request that a task reduce its time utilization, but it may deny the request.

To meet these potentially conflicting goals, we introduce a Resource List as shown below in Table 1. This data structure specifies the time utilization required for a task at each service level that it can support. Each entry contains the period, the utilization, the rate, and a function. The period specifies the cycle duration at which the task must execute, in milliseconds or system time units. The utilization specifies the number of milliseconds or system time units to be consumed in each period. The rate is computed as the utilization divided by the period, and is a measure of the percentage of the time being used by this task. The function parameter specifies a function which will be called when a specific period/utilization combination has been granted to the task. The task determines what period and utilization have been granted to it based on the function that is called.

If a task can only support a single level of quality of service, it would have only one entry in its Resource List. If there are several entries in the table, they are ordered by rate. The entry with the largest rate represents the best performance for the task; the entry with the smallest rate represents the minimum amount of processing that the task could reasonably get by with. Application developers can change the entries in the Resource List with a call to the Resource Manager 5.

The actual rate granted to a task will be one that appears in one of the entries in the table; the Resource Manager will not grant a period/utilization to a task unless that combination exists in its Resource List.

TABLE 1

Format of a Resource List

| Period (milliseconds) | Utilization (milliseconds) | Rate (computed) | Function |
|---|---|---|---|
| Period$_m$ | Utilization$_m$ | Utilization Period | Function$_m$ ← best |
| Period$_l$ | Utilization$_l$ | | ← grant |
| Period$_k$ | Utilization$_k$ | | |
| Period$_j$ | Utilization$_j$ | | |
| Period$_i$ | Utilization$_i$ | | ← minimal |
| — | — | | |
| Period$_a$ | Utilization$_a$ | Utilization Period | |

Each task presents to the Resource Manager 5 a Resource List with at least one entry. The application provides a callback function to be execute when the Scheduler 4 runs this task. During a calibration period, the utilization can be omitted by the user, and the Resource Manager 5 will fill it in.

What the Resource Manager Does

The Resource Manager 5 is responsible for admissions control and establishing grant sets.

The Resource Manager determines what time allocation is given to each task. The time allocation given to a task is called a "grant". A grant will correspond to one of the entries in the task's Resource List.

The grant for a task can change when one of three events occurs. The first is when a task enters or leaves the system. The second is when a task changes its Resource List. The third is when some task enters or leaves a "quiescent" state. The quiescent state is reserved for tasks which wish to run in the future, and want to reserve some processor time allocation for themselves, so that they will not possibly be denied admission later. However, these tasks are not currently using any time when they are quiescent; therefore, we want to free their time allocations for other tasks to use.

Figure 3:
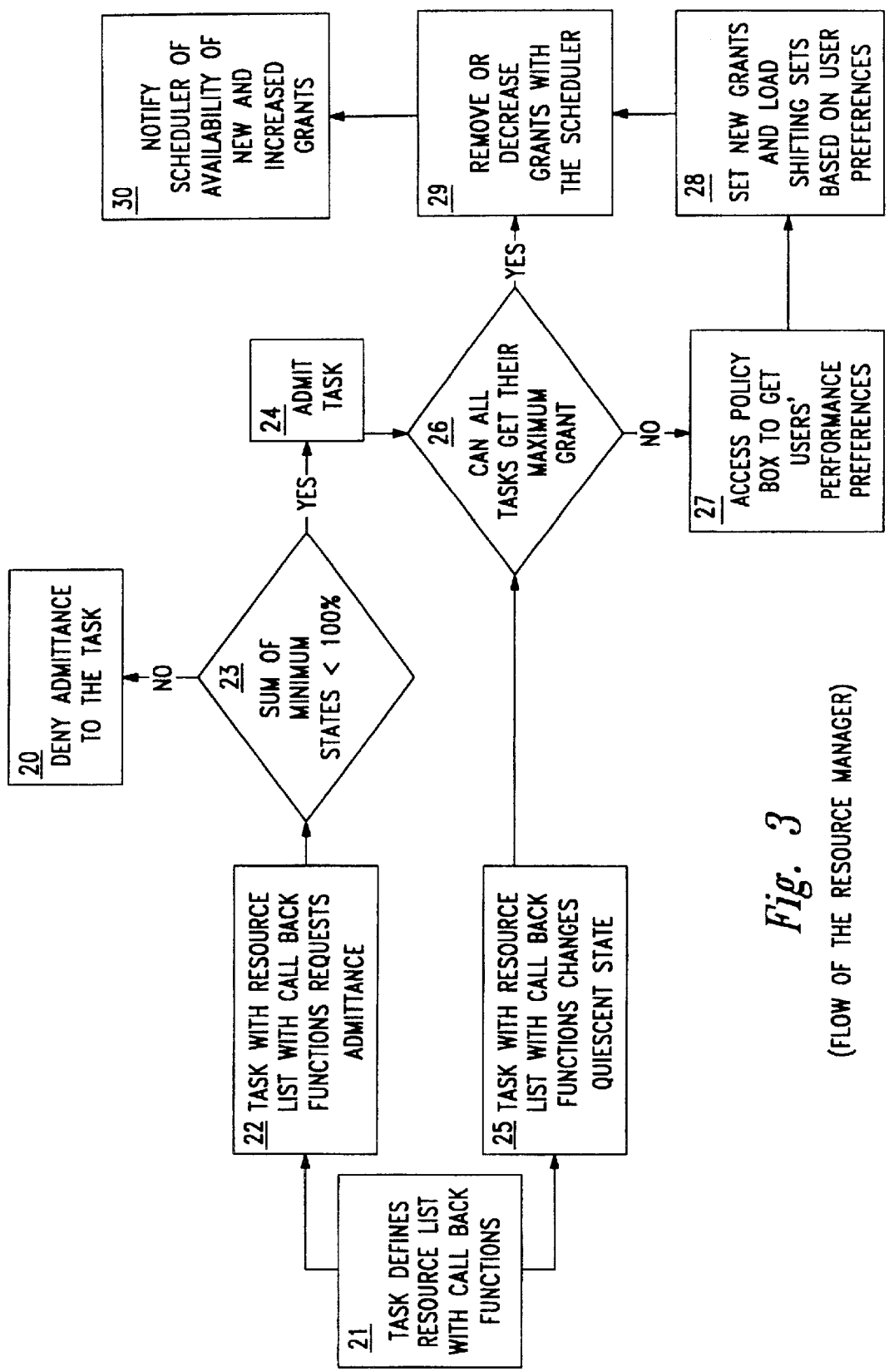
FIG. 3 is a flow chart showing the operation of the Resource Manager.

As shown in FIG. 3, when a new task starts up, step 21, it contacts the Resource Manager with its Resource List, step 22. The Resource Manager then does admissions control. A new task is allowed to enter the system if and only if the sum of the minimal grants for all tasks (both those which are currently runnable and those which are quiescent) in the system is less than or equal to 100%, step 23.

When a task enters the system, step 22 or leaves the system, or when a potentially quiescent task changes state, step 25, the Resource Manager must generate a new set of grants for all admitted tasks. At this time, the grant for a task may increase or decrease. As a first step in this process, it determines whether all tasks can get their maximum grant, step 26. If they cannot, the policy box is accessed to get the user's performance preferences, step 27, and the compromised grant set is calculated, step 28. With the new grant set established, the next step is to remove or decrease existing grants with the scheduler to free up resources, step 29, and the final step is to notify the scheduler of new and increased grants, step 30 The task will be informed indirectly because its utilization for the next period will be started with a call to the function associated with the new grant. Because the Resource Manager ensures that the sum of grants does not exceed 100%, the Scheduler 4 need only enforce the grants to be able to use a simple EDF scheme to successfully schedule all tasks.

$$\text{Admission control:} \sum_{i=0}^{Runnable} \text{rate(min)}_i + \sum_{j=0}^{Quiescent} \text{rate(min)}_j \leq 100\%$$

$$\text{Grant set:} \sum_{i=0}^{Runnable} \text{rate(grant)}_i \leq 100\%$$

What the Scheduler Does

Figure 4:
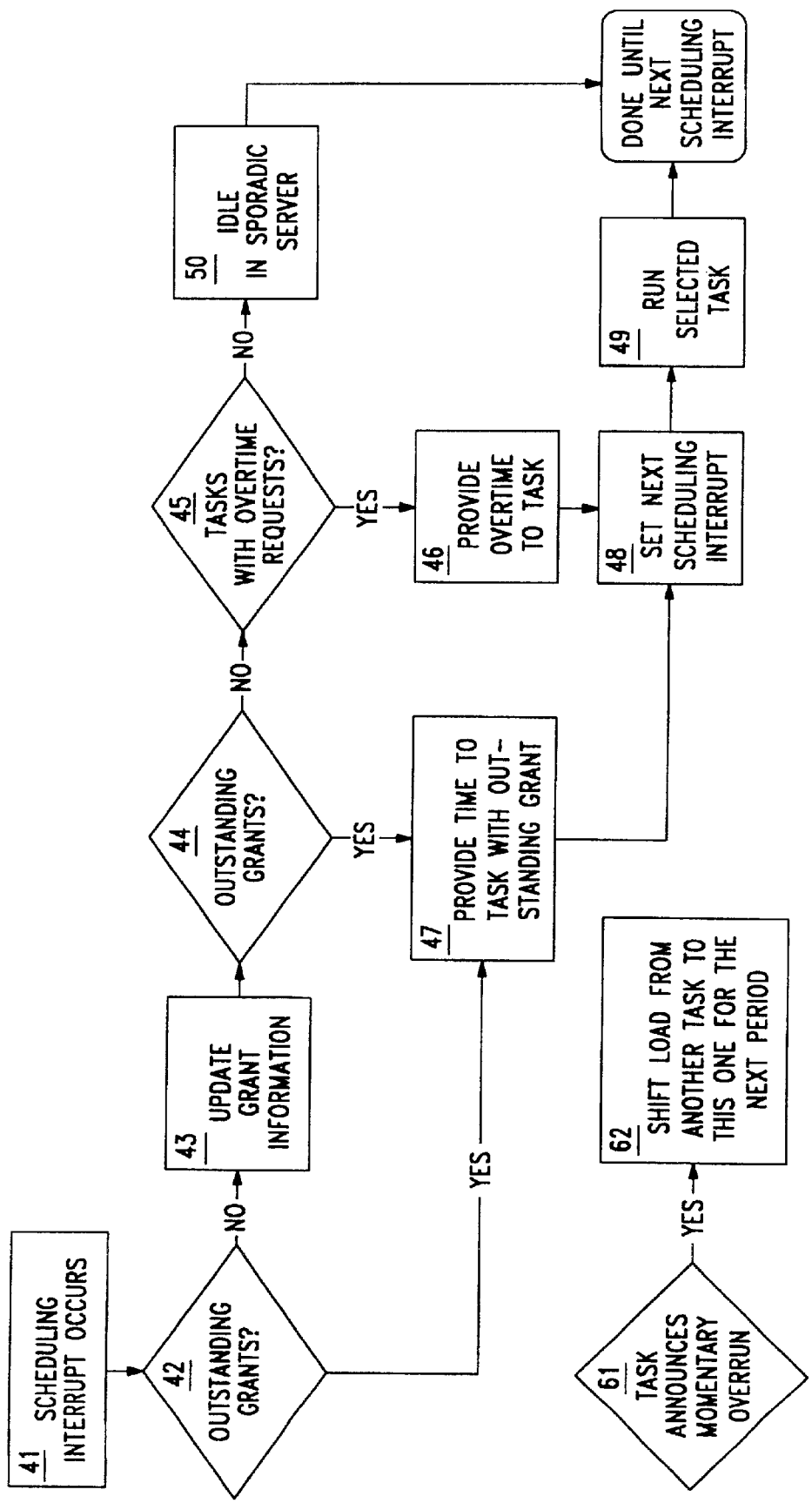
FIG. 4 is a flow chart showing the operation of the Scheduler.

The Scheduler 4 is responsible for determining what task to run next, for enforcing the grants, and for providing resource accounting to the Resource Manager, as shown in FIG. 4.

The input to the Scheduler is the grant set. This is the set of entries in the runnable tasks' Resource Lists which have been granted. The Scheduler augments the set of {period, utilization} with stated times for {next period begin, next period end }.

To determine what task runs next, the Scheduler uses an EDF algorithm. The deadline used is the period end for the grant. Whatever task has the closest next period end that has not already received its full grant for this period, is selected.

The next context switch will occur for one of three reasons. First, the task may yield the processor (with or without finishing its grant). Second, the task may exceed its grant. Third, another end-period may occur which precedes the current one.

Once a task has been selected, and before switching to the task, the Scheduler arranges for getting control again by setting a timer interrupt, step 48. The Scheduler sets a timer interrupt for the earliest of:

the end of the grant for the selected task, or the next period begin time for whichever task (other than the present task) has the soonest upcoming next period end time.

If the timer goes off in the first event, the task has exceeded its grant. If the timer goes off in the second event, a task with a shorter period that the one currently running has begun a new period, and has a deadline sooner than the running task.

At the end of a grant, or when the task yields the processor and indicates it is done with this period, the next period begin and next period end are updated. They are not updated when the task is granted the processor, because the task may be preempted.

As shown in FIG. 4, the process begins with an interrupt, step 41, and a check for outstanding grants, step 42. If a grant is outstanding, time is provided to the task, step 47, the next interrupt is set, step 48, and the task is run. If there were no outstanding grants, the grant set is updated, to determine if more resources have recently been requested. If this yields an outstanding grant, processing returns to step 47. If there are still no outstanding grants, the system checks for a task which did not finish within its grant and has made an overtime request. If there is such a task, time is provided to it, step 46 and processing continues to step 48. If no overtime has been requested, time is given to the sporadic server, step 50.

Shown in Table 2 below is a sample schedule for three tasks: a modem, a 3D graphics display, and an MPEG 3 decoder. At time 0, the grant set for the tasks looks as follows:

TABLE 2

Initial Grant Set for Three tasks:
Modem, MPEG decompression, and 3D graphics

|  | Period (milliseconds) | Utilization (milliseconds) | Rate | Function | Period Begin | Period End |
|---|---|---|---|---|---|---|
| Modem | 10 | 1 | 10.0% | Modem() | 0 | 10 |
| 3-D Graphics | 13.9 | 7 | 50.4% | Frame_72Hz() | 0 | 13.9 |
| MPEG | 30 | 10 | 33.0% | FullDecomp() | 0 | 30 |

TABLE 3

Subsequent Begin and End Periods for Three tasks:

|  |  |  |  | Time 5 | | Time 11 | | Time 29 | |
|---|---|---|---|---|---|---|---|---|---|
|  | Period | Util | Rate | Begin | End | Begin | End | Begin | End |
| Modem | 10 | 1 | 10.0% | 10 | 20 | 20 | 30 | 30 | 40 |
| 3-D Graphics | 13.9 | 7 | 50.4% | 0 | 13.9 | 13.9 | 27.8 | 27.8 | 41.7 |
| MPEG | 30 | 10 | 33.0% | 0 | 30 | 0 | 30 | 30 | 60 |

Modem, MPEG Decompression, and 3D Graphics

Shown in Table 3 above is the schedule for the first 70 milliseconds for running these tasks. This schedule over 66 milliseconds is shown graphically in FIG. 2.

Here is pseudo code for the operation of the Scheduler.

```
while (1) {
   task_to_run=find_task (min "period_end" AND
      "period_begin" <=time_now);
   if (preempting_task=find_task ("period_end" <task_
      to_run ("period_end")
      AND min ("period_begin"))) {
      alarm_time=preempting_jask ("period_begin");
   } else {
      alarm_time=time_now+task_to_run ("utilization");
   }
   set_timer (alarm_time);
   run (task_to_run);
   /* if the user returns here, they have finished their grant
      for this period */
   task_to_run (period_begin)+=task_to_run (period);
   task_to_run (period_end)+=task_to_run (period);
```

Note that the 3D graphics task runs without preemption for three of the five periods shown, but the MPEG decoding task is always preempted at least once.

What the Policy Box Does

The Policy Box 9 is the source of information regarding how different tasks 2 should be traded off one against the other when there are insufficient resources for all tasks to be given their highest level of processor time.

For every supported set of tasks 2, the Policy Box 9 knows the relative importance of each task to the user. There is a default set of ratings which initially ships with the product. This set of ratings can be overridden by the user or system administrator of the system.

There are many ways such a policy box could be implemented. The presently preferred embodiment maintains a set of percentages which correspond to the relative allocation of processor time for each task in a set. These percentages are unrelated to the actual rates that could be supported by the tasks, which are described in their Resource Lists 21. The set of percentages is returned by the Policy Box 9 to the Resource Manager 5 when the system is overloaded.

For each admitted task, the Resource Manager 5 selects the two Resource List Entries which are immediately higher and lower than the percentage named by the Policy Box 9. If the sum of the higher entries for each task so selected is less than 100% of the processor time, all tasks get this higher entry. If the sum is too large, the task with the greatest distance between its higher level and the percentage named for it by the Policy Box 9, is given its lower level. We iterate this process until the sum of the grants is less than 100% of the processor time available.

A final additional pass is made if the sum of the grants is less than 100%. If possible, we increase the grants for tasks so that as near to 100% is used as possible. Again, the task with a next higher level closest to the currently selected level is given additional processor time first.

From the Perspective of a Task

Here is what the Scheduler 4 and Resource Manager 5 do from the perspective of a task 2. There are two kinds of tasks, normal tasks and quiescent tasks. Normal tasks are those which are ready to run. Quiescent tasks have temporarily relinquished their right to be scheduled; they have no stated next period begin time.

NORMAL TASKS

When a task first starts up, it calls the Resource Manager, step 22, with its Resource List 21. It may run a calibration loop at this point, or the entries of the Resource List may be filled in except for the rate. In any case, at least the function must be filled in, and eventually, the period, utilization, and rate are filled in as well.

The next time the task gets control is when one of its functions named in the Resource List has been called, as shown in FIG. 1. The task does not get control in any way except through one of these functions. The function should correspond to an atomic set of work to be completed, such as computing one frame, or computing a set of frames. When the frame is complete, the function return effectively yields the processor, and the task is complete for this period.

The task will be called again some time in the next period for that task, either through the same function, or potentially through some other function that it has named in its Resource List. Every time the task is called through one of these functions, it is given a reporting on its actual utilization in the last period. This can optionally be used by the task to adjust its Resource List. (Note that the duration of use of the period may be different between any two periods.)

The task can adjust its Resource List at any time, and still be guaranteed admittance to the system, with the single caveat that the minimum rate specified must not be greater than the previous minimum rate. Entries can be added, removed, or modified, or new functions specified at will. The new entries will be in effect for the next period.

If the task exceeds its grant (i.e. if it does not yield before the grant is over), the task is immediately preempted and the task will be notified of the overrun the next time that it runs. In the next period that it runs, the task can choose to continue with the same processing, to shed load, or whatever else is appropriate. As shown by steps 45 and 46 of FIG. 4, if there are excess resources, any task that has not completed before its grant expired will be allowed to run. If there are two or more such tasks, the task with the earliest deadline is allowed to run first, until its deadline is reached. However, the application writer should not plan on there being extra resources beyond the grant.

QUIESCENT TASKS

The system is able to reserve time for a task that does not need to run immediately, but which cannot be denied admittance when it does need to run. If such a task waited until it needed resources to register with the Resource Manager 5, the sum of the minimum times for the task set could already be at 100%, step 23. Then we would either have to deny this task, step 20 (which we postulate we cannot do), or kill some already running task (which contravenes one of the first principles). Alternatively, we could have this task spin in some kind of idle loop when it really wanted to be quiescent, but this contravenes another first principle: that we constructively use 100% of the time of the machine if there are tasks present that could use them.

We solve this problem by introducing the notion of a quiescent task. At startup, this task registers with the Resource Manager as usual, step 22. Its Resource List 21 matches the times it would require when it was actually running; there is no special entry for the quiescent state. Its minimum requirements will be used for admission control. An argument to the call to the Resource Manager identifies a quiescent task, and the task will be suspended once it has been admitted to the system.

Note that sleeping is fundamentally different from quiescence. A task which sleeps (blocks) cannot be effectively scheduled as a periodic task; the Sporadic Server, discussed below, can schedule tasks which sleep, but the Processor Resource Distributor cannot make any scheduling guarantees for a task in any period in which it has blocked. A quiescent task is one which is allocated through the Resource Manager, but which is not being scheduled while it is quiescent.

When the task is awakened from quiescence by some external event, the grant set will be recomputed, but the admission control work has already been done. When a quiescent task wakes up, other tasks will be given smaller grants for their next periods, step 29, if there is insufficient time to run the newly woken task. However, we are assured that there is a grant set that fits the times available because of the admissions control formula: at worst, all tasks run at their minimum.

The quiescent task may return to the quiescent state (as can any task) with a call to the Resource Manager 5, which again reconfigures the grant set, and suspends the task. An example normal task: MPEG 2 video decoding MPBG 2 video decoding is an example of a normal task. It has a natural period of 30 milliseconds, which is the frame refresh rate defined by the MPEG standard. In a particular processor where the invention will be used, about 33% of the processor time will be used to accomplish this task.

There are three kinds of frames involved in MPEG decoding, and the three kinds of frames have very different utilizations. Initial (I) frames have the least decompression, and require the lowest amount of processor times; P frames are computed from the I frames, and require a medium amount of processor time; and B frames are computed from the previous pair of I or P frames, and require the most processor time . The relative amount of processor time required between a B and an I frame is about 2:1. If an I frame is not computed, no updates are possible until the next I frame is received, which is not more than ½ second later. In summary, the most load can be shed if B frames are dropped, and if I frames are dropped, the user will experience a glitch of up to ½ second.

Different video standards require different combinations of MPEG frames, but a display could contain a random selection of frame types. For example, consider a standard which requires decompressing MPEG frames in the order (IPBBPBBPBBPBBPB)(repeat) From this, one possible time list for an MPEG task would be as shown in Table 4 below:

TABLE 4

Possible Resource List for an MPEG Video decoding task: load shedding drops ¼, ⅓ or ⅕ of the frames.

| | Period (milliseconds) | Utilization (milliseconds) | Rate | Function |
|---|---|---|---|---|
| BEST | 30 | 10 | 10/30 = 33.3% | FullDecompress() |
| | 120 | 30 | 30/120 = 25% | Drop_B_in_4() |
| | 90 | 20 | 20/90 = 22.2% | Drop_B_in_3() |
| MINIMUM | 120 | 20 | 20/120 = 16.7% | Drop_2B() |

In a system that is not overloaded, the best Resource List entry would be used, giving full decompression. In an overload situation, the user has the option of viewing fewer frames per second. The presence of the load shedding options does not imply that they provide acceptable viewing quality in any real sense, but rather are computationally possible, meaningful alternatives.

Note that this Resource List implies that the MPEG task requires that a whole frame be decompressed in the same way: we cannot change the utilization within a single frame. If there are other tasks with shorter periods, when this task is called with any of its functions, it is nearly certain to be preempted because even the shortest period, 30 milliseconds, is a very long period. There is a separate, orthogonal method we use to coordinate when a preemption should optimally occur. It is discussed in more detail in a later section.

If the MPEG task overruns its grant for some reason, it will be preempted, and will receive notification in the next period. The action it takes when it regains control depends on the type of frame it had been decompressing. If it was a B frame, it may just choose to drop it, and continue with the next frame. If it was an I frame, it would probably finish it, and perhaps note to drop the next B frame. Whatever is the correct thing to do, the MPEG task will make the decision itself. If it is consistently overrunning its grant, it probably needs to change the utilization request associated with this function in its Resource List.

An Example Quiescent Task: Answering the Phone

The user may have a task which answers the telephone and establishes a modem connection with a caller. Until the phone rings, the task has nothing to do. Once the phone rings, the task must be allocated sufficient processor time to make and maintain the connection.

From an allocation perspective, this is a task that cannot be denied admission by admission control when it wants to run. Effectively, we must reserve time for it. We can simply accomplish this with a quiescent task.

Any time prior to the telephone ringing, the phone answering task registers with the Resource Manager, establishing its minimum requirements when running. It is suspended until the operating system wakes it up when there is an incoming call. The Resource Manager will recompute the grant sets, but is guaranteed to find a workable schedule because of the admissions control algorithm. When the telephone answering task is not running, its time is available to provide a higher level of service for the other tasks in the system.

Managing Overruns: Load Shifting

The method of grant allocation and scheduling works ideally when the time required per period is relatively constant. Some periodic tasks, such as MPEG and audio, fit this model extremely well. There are other tasks, such as 3D, whose processing requirements are dependent not on some fixed value, such as the number of pixels on the screen, but on some highly variable value, such as the number of polygons in a scene. Most 3D tasks have a Polygon Budget which tries to bound this problem, but current Budgets of 5,000–10,000 polygons per frame still leave a performance variation of 2:1.

Even if the 3D application designer requests an allocation sufficient to handle 10,000 polygons, there may still be frames which exceed this number. And, of course, if the bulk of the frames use only 5000 polygons, nearly half the processing capacity reserved for 3D is wasted.

To address this problem, we have invented the idea of load shifting. Many systems expect a task to do load shedding: perhaps dropping partially processed polygons part-way through the calculations for a frame. In addition to such load shedding, we also allow load shifting which is the controlled transfer of time for one task to another for a limited duration. This allows us to allocate a lesser amount of time to a task like 3D on a regular basis, while still making the extra time available to it on an as-needed basis, all while not damaging the performance of another task.

The possibility of load shifting is first specified in the Policy Box 9. A set of tasks is linked together to indicate that one may overrun its grant. In the event of an overrun (either already past or anticipated), the Scheduler 4 can shift time from other tasks in the set to the overrun task for this single period. For this period, the tasks which have donated the time will receive a callback associated with a smaller amount of time than they had been being given: in other words, less than their current grant. The time given to the donating task must still be one listed in its Resource List, and we cannot change the allocation for the task doing the donating if it has already started running and been preempted in this period. For this reason, there is a significant advantage to a task like 3D if it can report very early in its utilization for the period that it will overrun, as shown by steps 61 and 62 in FIG. 4. For 3D, this is fairly trivial, since utilization is a direct function of the number of polygons to be processed which is known at the beginning of the period.

Whether load shifting is performed is managed by the Policy Box: load shifting can be disabled by a user, or new sets of tasks which shift load can be added.

Managing Non-Periodic Tasks

Some tasks do not perfectly match the periodic, high latency model expected by the simplest form of the processor resource distributor. This includes aperiodic tasks, and those which have very low latency requirements. Tasks with either of these characteristics are handled in different ways.

Aperiodic Tasks

Tasks which are aperiodic do not have a natural period. Quiescent tasks may be thought of as an example of this, except that we characterize a quiescent task by its behavior when it is running, not when it is quiescent. There could be an aperiodic quiescent task, but most quiescent tasks are periodic. The aperiodic model can be used to support task creation and some other housekeeping tasks that are not predictable.

Aperiodic tasks are handled by a sporadic server. A sporadic server runs periodically with an extremely small utilization, checking a queue for work. If work is available, it contacts the Resource Manager 5 to request a larger grant. The minimum entry in the Resource List for the periodic server is used for the mode where the sporadic server is idle but checking for work to do, as shown by step 50 in FIG. 4. When work arrives, a new Resource List with the same minimum entry, but also with entries requesting increased utilization, is presented to the Resource Manager. If the system is not overloaded, a grant will be made to the sporadic server, which it will use to do the aperiodic work. When the work is complete and the queue empty, the sporadic server makes another call to the Resource Manager with just the minimum entry in its Resource List.

The best latency that can be achieved for a task running under the sporadic server is a function of the amount of time that it takes to implement a new grant. In the worst successful case, this is the sum of all the outstanding grant periods. The very worst case even if only a single aperiodic task is in the system is that admissions control may deny the entry to the new Resource List. This would occur only if the system were overloaded and the Policy Box indicated that all running tasks should be given precedence over the sporadic server. Such a policy could be modified by the user.

Low Latency and High Frequency Tasks

The minimum latency that can be supported by the processor resource distributor is determined in part by the time it takes to do a context switch. It is also indirectly limited by the smallest unit of time that the normal tasks which are running need between preemptions to avoid excess data traffic. (For instance, data may be in the cache which is frequently accessed in one phase of the task, but not in another: the ideal context switch time would be between these two phases.)

The processor resource distributor provides approximately 500 microsecond granularity. However, there are tasks that need to run more than 1000 (or even more than 2000) times per second, for which this mechanism will not work. Obviously, the tasks running more than 1000 times per second are also using less than 1 millisecond per iteration. These are low latency, high frequency tasks. An example is a DMA interrupt occurring on behalf of the audio command stream, which may interrupt 2800 or even 8000 times per second, but only a few instructions are executed on each iteration. Further, the latency requirement for responding to these events is on the order of a single microsecond.

These tasks are run as interrupt handlers, because the time to do a context switch this often would itself overload the system. The interrupt handler will not do a full context switch, and the set of registers which can be used at interrupt level are limited as well. For scheduling, we reserve some amount of the processor for interrupt handling. We increase or decrease this amount depending on which task set is run. This marginally affects our goal of using 100% of the processor, but since these tasks must have a utilization smaller than their own latency requirement, the total utilization is not too large.

Static and Dynamic Task Sets: Legacy Applications

The processor resource distributor depends on being able to do admissions control when a task starts up. Without this, we cannot make guarantees about being able to continue to run, or even about the user being able to reliably affect policy with respect to which tasks will run successfully.

In the Windows environment and in the set-top box environment, we do this because any task must eventually initiate a request through a driver. Further, the requests are generated by the user in an interactive fashion (at least indirectly). For instance, the user selects "play" from their CD player.

In a DOS environment, we do not have these guarantees. There are legacy applications in the DOS environment that expect to be able to address the hardware ports directly. No setup is performed through a driver, or any other OS API. The processor will support these applications by preloading the processor drivers on DOS boxes. We also preload a Resource List for each possible task. The admissions control is done statically, effectively at operating system load time. An initial grant set is pre-established that assumes that all the preloaded devices are running. Note that if Windows is loaded on top of DOS, this allocation and schedule will be replaced with one which is created dynamically, and which can accommodate the creation and deletion of tasks.

Terms of a Grant

When a grant is made to a task, the system has made a very specific guarantee. For a grant of processor utilization, the system promises that the granted amount of processor time will be allocated to the task in every named period. As an example, say the 3D graphics have been allocated 7 milliseconds out of every 14 milliseconds. Every 14 milliseconds, the 3D graphics will be given 7 milliseconds. The 7 milliseconds may come at the beginning of the period, or at the end of the period, or may even be split into several sections, with the task having been preempted in between. The longest time that can pass with no time allocated to the task is (2*period−2*utilization). For this task, that would be 28−14=14 milliseconds. The task must have sufficient buffering to handle this case.

Yielding

One of the assumptions made about the periodic tasks in this system is that, except in response to a preemption request, they do not yield the processor (block) until they are finished with their work for this period. They do not block waiting for an external event. Aperiodic tasks, which run in the context of the sporadic server, may block any time. When the task is woken, it will be placed on the work queue of the sporadic server, and executed as anything placed on that queue.

If an aperiodic task blocks, it cannot expect to receive the rest of its grant for this period. The problem is that the admissions control guarantees rely on the system being able to use every millisecond of processor time. Consider, for example, two tasks. One has been granted 1 millisecond every 3 (33% rate), the other 5 milliseconds every 10 (50% rate). The total utilization is only 83%.

Now suppose that the 10 millisecond task yields the processor after one millisecond to wait for an event, and could continue to run when the event returns at 7 milliseconds. The 3 millisecond task runs in millisecond 1 and again in millisecond 4. Theoretically, once the event returns, the 10 millisecond task could use the next four milliseconds, from 7 through 10, and meet its deadline. However, the second task, with its period of three milliseconds, must also use one of those milliseconds, 7 or 8 or 9. This schedule cannot be met.

There is a more simple problem with blocking which can be demonstrated with only a single task. The task could wake up when the deadline can no longer be met, either because it is already passed, or because the time remaining in the utilization is greater than the time to the deadline.

Glossary

Admissions control—the process by which it is determined if a new task will be allowed to run.

Aperiodic task—a task which does not have a natural period. Examples are tasks which execute short user command requests.

Calibration Loop—A set of iterations of the functions specified in the Resource List which are run to determine how much processor utilization they require. The result of the calibration loop can be used to fill in the Resource List entries.

Context Switch—when the task which is running on the processor is changed from one to another.

EDF—Earliest Deadline First—a scheduling policy by which the task on the run queue with the earliest deadline is selected to run next. Under simple circumstances, this algorithm is proven to be able to schedule any set of tasks which is schedulable by any method.

Exception—an out-of-band notification. When an exception is received, a task PC is set to its exception handler.

Grant—An assignment of time over a (repeating) period of time. For example, 10 milliseconds of processor every 30 milliseconds.

Grant Set—The set of grants for all tasks which have been admitted to the system.

Minimal Entry—the entry in a task's Resource List which has the smallest rate of utilization.

Best Entry—the entry in a task's Resource List which has the greatest rate of utilization, and which provides the highest quality of service to the user.

Period Begin—The beginning of the next period for a periodic task.

Period End—The time at which the current grant expires.

Policy Box—the function which returns an ordering of tasks and service levels which are desired by the user. Used when the system is in overload to decide which tasks should run, and at what level of quality of service.

Preempt—when the processor is taken from the currently running task and given to another, the task that had been running is said to be preempted, and the action of removing it from the processor is called a preempt.

Quality of Service (QOS)—the level of quality that is provided by an application.

When an application sheds load, it provides a lower Quality of Service.

Quiescent Task—a task which has been admitted to the system, but which is not currently eligible to be scheduled. A quiescent task has given up its period.

When it awakens a new grant set must be computed, but admissions control does not need to happen.

Resource List—A set of specifications which define useful period/utilization combination that are meaningful for a given task. Used to manage admissions control and load shedding in overload conditions.

Resource Manager—the code responsible for parceling out times to tasks in the system. For policy, the Policy Box is referenced. The Resource Manager is responsible both for admissions control and for determining the grant set.

Scheduler—the function responsible for selecting which of a pre-defined set of tasks should run next, and for enforcing the processor utilization grants.

Set top Box—A non-distributed system, not a PC, which probably has a user interface, and which makes available media devices. "Set top" refers to being on top of a TV set.

Sporadic Server—A task which runs periodically itself, which provides execution time for tasks which are naturally aperiodic.

Task—a single stream of execution doing a job on behalf of a user. There could be multiple tasks involved in MPEG decoding, for instance, although synchronization between them is managed by their periodicity.

Yield—When a task relinquishes the processor, and enters an inactive state itself.

The embodiment described above is only illustrative of the invention. Many alternative embodiments are possible. The invention is defined by the following claims.

I claim:

1. A method in a computer system for admitting tasks to be performed on a processor, comprising:
   (a) receiving requests for execution on said processor from at least three tasks each having at least a respective high level of use of time on said processor, the respective high use level providing a high quality of performance of the respective task, and at least two of said tasks each having a respective low level of use of time on said processor, the respective low use level providing a low quality of performance of the respective task;
   (b) admitting for processing at least two but not all of said tasks, including at least one of said tasks having a respective low use level, the admitted tasks selected such that the sum of their respective low use levels does not exceed the total time available on said processor and such that there is insufficient unused time on said processor to admit any one of the remaining tasks at its respective low use level; and
   (c) excluding from admission for processing said remaining tasks.

2. The method of claim 1 wherein, when there is insufficient time on said processor to execute all of said admitted tasks at their respective high use levels, the method further comprises:
   (d) commencing execution of the admitted tasks with at least one of the admitted tasks executing at its respective low use level; and
   (e) when one or more of said admitted tasks temporarily ceases to require execution and said processor has sufficient unused time available to execute at its respective high use level a task which was executing at its respective low use level, switching execution of said task to its respective high use level.

3. The method of claim 1 further comprising:
   (d) commencing execution of said admitted tasks; and
   (e) when one or more of said admitted tasks temporarily ceases to require execution and said processor has sufficient unused time available to undertake a not already admitted task which requests execution, excluding said not already admitted task from admission.

4. The method of claim 1 further comprising:
   (d) commencing execution of said admitted tasks and,
   (e) if a previously excluded task again requests admission, again excluding said task unless one of said previously admitted tasks has terminated and the sum of the low use levels of the remaining admitted tasks is small enough that said previously excluded task can be admitted without exceeding the time available on said processor.

5. The method of claim 1 wherein at least one of said admitted tasks has at least three use levels.

6. A method in a computer system for a processor resource distributor to assign processor time to tasks comprising:
   (a) receiving for each of two or more tasks requests for processor time, at least one of said requests including specification of two or more levels of processor use for a bi-level task associated with said request, each of said two or more levels specified by a cycle duration for division of real time and, for each cycle duration, specification of a portion of each cycle to be allocated to said bi-level task; and
   (b) allocating processor time to each of said two or more tasks based on said requests and allocating processor time for said bi-level task by selecting one of said specified cycle durations and portions of each cycle.

7. The method of claim 6 wherein each of said two or more levels is associated with a call back function for said bi-level task and said task is called by using the call back function associated with said selected specified cycle duration and portion of each cycle.

8. The method of claim 6 wherein said selection is based on the amount of processor time available and the selected level is the level which is associated with the largest portion of each cycle that can be accommodated within the amount of processor time available.

9. A method in a computer system for adjusting allocation of time on a processor between at least two tasks, comprising:
   (a) dividing time on said processor into a series of is periods, commencing execution on said processor of a first task, and allocating to said first task a portion of each of said first periods;
   (b) dividing time on said processor into a series of second periods which may or may not be the same as said series of first periods, commencing execution on said processor of a second task at a high level of use during each of said second periods, said high level providing a high quality of performance of said second task, said second task also being capable of executing at a low level of use during said second periods, said low level using less processor time than said high level and providing a lower quality of performance than said high level, and allocating to said second task a portion of each of said second periods; and
   (c) if said first task requires more processor time in one of the first periods than the processor time allocated to it, switching said second task to its low level of use and reallocating at least a portion of the time on said processor which is thereby made available to said first task.

10. The method of claim 9 wherein the switching of said second task to its low level of use occurs at the end of the then present second period of said series of second periods and takes effect for the succeeding second period.

11. The method of claim 9 wherein the determination of whether said first task requires more processor time in one of the first periods than the processor time allocated to it is made by prediction based on an estimate of time that said first task will require in said first period and the switching and reallocating are done before said first task exhausts its allocated time in said first period.

12. The method of claim 11 wherein the switching of said second task to its low level of use occurs at the end of the then present second period of said series of second periods and takes effect for the succeeding second period.

13. The method of claim 9 further comprising:
 (d) between steps (b) and (c), commencing execution on said processor of a third task executing at a high level of use of time on said processor, said high level providing a high quality of performance of said third task, said third task also being capable of executing at a low level of use of time on said processor, said low level using less processor time than said high level and providing a lower quality of performance than said high level; and,
 (e) in step (c), switching said second task to its low level of use rather than switching said third task to its low level of use based on a previously made selection that, in the event that said first task requires more processor time than the processor time allocated to it, said second task will be switched to its low use level rather than said third task.

14. A method in a computer system for adjusting use of time on a processor by a task, comprising:
 (a) dividing time on said processor into a series of periods;
 (b) commencing execution on said processor of a task executing at a high level of use of time on said processor, said high level providing a high quality of performance of said task, said task also being capable of executing at a low level of use of time on said processor, said low level using less processor time than said high level and providing a lower quality of performance than said high level;
 (c) allocating to said task a portion of each of said periods; and
 (d) if said task requires more processor time in a period than the processor time allocated to it, switching said task to its low use level.

15. The method of claim 14 wherein said task is switched to its low use level for the next period.

16. The method of claim 14 wherein the determination that said task will require more processor time in a period than the processor time allocated to it is made by prediction based on an estimate of time that the task will require in said period and the switching is done before said task exhausts its allocated time in said period.

17. A method in a computer system for adjusting use of time on a processor by a task, comprising:
 (a) dividing time on said processor into a series of periods;
 (b) commencing execution on said processor of a first task executing at a high level of use of time on said processor, said high level providing a high quality of performance of said first task, said first task also being capable of executing at a low level of use of time on said processor, said low level using less processor time than said high level and providing a lower quality of performance than said high level;
 (c) allocating to said first task a portion of each of said periods;
 (d) commencing execution on said processor of a second task executing at a high level of use of time on said processor, said high level providing a high quality of performance of said second task, said second task also being capable of executing at a low level of use of time on said processor, said low level using less processor time than said high level and providing a lower quality of performance than said high level; and,
 (e) if said first task requires more processor time in a period than
 the processor time allocated to it, switching said second task to its low level of use rather than switching said first task to its low level of use based on a previously made selection that, in the event that said first task requires more processor time than the processor time allocated to it, said second task will be switched to its low use level rather than said first task.

18. A computer readable medium containing a computer program which, when run in a computer system, causes the system to perform the following method for admitting tasks to be performed on a processor:
 (a) receiving requests for execution on said processor from at least three tasks each having at least a respective high level of use of time on said processor, the respective high use level providing a high quality of performance of the respective task, and at least two of said tasks each having a respective low level of use of time on said processor, the respective low use level providing a low quality of performance of the respective task;
 (b) admitting for processing at least two but not all of said tasks, including at least one of said tasks having a respective low use level, the admitted tasks selected such that the sum of their respective low use levels does not exceed the total time available on said processor and such that there is insufficient unused time on said processor to admit any one of the remaining tasks at its respective low use level; and
 (c) excluding from admission for processing said remaining tasks.

19. The computer readable medium of claim 18 wherein, when there is insufficient time on said processor to execute all of said admitted tasks at their respective high use levels, the method further comprises:
 (d) commencing execution of the admitted tasks with at least one of the admitted tasks executing at its respective low use level; and
 (e) when one or more of said admitted tasks temporarily ceases to require execution and said processor has sufficient unused time available to execute at its respective high use level a task which was executing at its respective low use level, switching execution of said task to its respective high use level.

20. The computer readable medium of claim 18 wherein the method further comprises:
 (d) commencing execution of said admitted tasks; and
 (e) when one or more of said admitted tasks temporarily ceases to require execution and said processor has sufficient unused time available to undertake a not already admitted task which requests execution, excluding said not already admitted task from admission.

21. The computer readable medium of claim 18 wherein the method further comprises:
 (d) commencing execution of said admitted tasks and,
 (e) if a previously excluded task again requests admission, again excluding said task unless one of said previously admitted tasks has terminated and the sum of the low use levels of the remaining admitted tasks is small enough that said previously excluded task can be admitted without exceeding the time available on said processor.

22. The computer readable medium of claim 18 wherein at least one of said admitted tasks has at least three use levels.

23. A computer readable medium containing a computer program which, when run in a computer system, causes the system to perform the following method for a processor resource distributor to assign processor time to tasks:

(a) receiving for each of two or more tasks requests for processor time, at least one of said requests including specification of two or more levels of processor use for a bi-level task associated with said request, each of said two or more levels specified by a cycle duration for division of real time and, for each cycle duration, specification of a portion of each cycle to be allocated to said bi-level task; and (b) allocating processor time to each of said two or more tasks based on said requests and allocating processor time for said bi-level task by selecting one of said specified cycle durations and portions of each cycle.

24. The computer readable medium of claim 23 wherein each of said two or more levels is associated with a call back function for said bi-level task and said task is called by using the call back function associated with said selected specified cycle duration and portion of each cycle.

25. The computer readable medium of claim 23 wherein said selection is based on the amount of processor time available and the selected level is the level which is associated with the largest portion of each cycle that can be accommodated within the amount of processor time available.

26. A computer readable medium containing a computer program which, when run in a computer system, causes the system to perform the following method for adjusting allocation of time on a processor between at least two tasks:

(a) dividing time on said processor into a first series of periods, commencing execution on said processor of a first task, and allocating to said first task a portion of each of said periods of said first series;

(b) dividing time on said processor into a second series of periods which may or may not be the same as said first series of periods, commencing execution on said processor of a second task executing at a high level of use during each of said periods of said second series, said high level providing a high quality of performance, said second task also being capable of executing at a low level of use during said second periods, said low level using less processor time than said high level and providing a lower quality of performance than said high level, and allocating to said second task a portion of each of said periods of said second series; and (c) if said first task requires more processor time in a period of said first series than the processor time allocated to it, switching said second task to its low level of use and reallocating at least a portion of the time on said processor which is thereby made available to said first task.

27. The computer readable medium of claim 26 wherein the switching of said second task to its low level of use occurs at the end of the then present period of said second series of periods and takes effect for the succeeding period of said second series.

28. The computer readable medium of claim 26 wherein the determination of whether said first task requires more processor time in a period of said first series than the processor time allocated to it is made by prediction based on an estimate of time that the task will require in said period and the switching and reallocating are done before said first task exhausts its allocated time in said period.

29. The computer readable medium of claim 28 wherein the switching of said second task to its low level of use occurs at the end of the then present period of said second series of periods and takes effect for the succeeding period of said second series.

30. The computer readable medium of claim 26 wherein the method further comprises:

(d) between steps (b) and (c), commencing execution on said processor of a third task executing at a high level of use of time on said processor, said high level providing a high quality of performance, said third task also being capable of executing at a low level of use of time on said processor, said low level using less processor time than said high level and providing a lower quality of performance than said high level; and, (e) in step (c), switching said second task to its low level of use rather than switching said third task to its low level of use based on a previously made selection that, in the event that said first task requires more processor time than the processor time allocated to it, said second task will be switched to its low use level rather than said third task.

31. A computer readable medium containing a computer program which, when run in a computer system, causes the system to perform the following method for adjusting use of time on a processor by a task:

(a) dividing time on said processor into a series of periods;

(b) commencing execution on said processor of a task executing at a high level of use of time on said processor, said high level providing a high quality of performance, said task also being capable of executing at a low level of use of time on said processor, said low level using less processor time than said high level and providing a lower quality of performance than said high level;

(c) allocating to said task a portion of each of said periods; and (d) if said task requires more processor time in a period than the processor time allocated to it, switching said task to its low use level.

32. The computer readable medium of claim 31 wherein said task is switched to its low use level for the next period.

33. The computer readable medium of claim 31 wherein the determination that said task will require more processor time in a period than the processor time allocated to it is made by prediction based on an estimate of time that the task will require in said period and the switching is done before said first task exhausts its allocated time in said period.

34. A computer readable medium containing a computer program which, when run in a computer system, causes the system to perform the following method for adjusting use of time on a processor by a task:

(a) dividing time on said processor into a series of periods;

(b) commencing execution on said processor of a first task executing at a high level of use of time on said processor, said high level providing a high quality of performance of said first task, said task also being capable of executing at a low level of use of time on said processor, said low level using less processor time than said high level and providing a lower quality of performance than said high level;

(c) allocating to said first task a portion of each of said periods;

(d) commencing execution on said processor of a second task executing at a high level of use of time on said processor, said high level providing a high quality of performance for said second task, said second task also being capable of executing at a low level of use of time on said processor, said low level using less processor time than said high level and providing a lower quality of performance than said high level for said second task; and, (e) if said first task requires more processor time in a period than the processor time allocated to it, switching said second task to its low level of use rather than switching said first task to its low level of use based on a previously made selection that, in the event that said first task requires more processor time than the processor time allocated to it, said second task will be switched to its low use level rather than said first task.

35. A device in a computer system for admitting tasks to be performed on a processor, comprising:

(a) means for receiving requests for execution on said processor from at least three tasks each having at least a respective high level of use of time on said processor, the respective high use level providing a high quality of performance of the respective task, and at least two of said tasks each having a respective low level of use of time on said processor, the respective low use level providing a low quality of performance of the respective task;

(b) means for admitting for processing at least two but not all of said tasks, including at least one of said tasks having a respective low use level, the admitted tasks selected such that the sum of their respective low use levels does not exceed the total time available on said processor and such that there is insufficient unused time on said processor to admit any one of the remaining tasks at its respective low use level; and (c) means for excluding from admission for processing said remaining tasks.

36. The device of claim 35 further comprising:

(d) means for commencing execution of the admitted tasks with at least one of the admitted tasks executing at its respective low use level; and (e) means for, when one or more of said admitted tasks temporarily ceases to require execution and said processor has sufficient unused time available to execute at its respective high use level a task which was executing at its respective low use level, switching execution of said task to its respective high use level.

37. The device of claim 35 further comprising:

(d) means for commencing execution of said admitted tasks; and (e) when one or more of said admitted tasks temporarily ceases to require execution and said processor has sufficient unused time available to undertake a not already admitted task which requests execution, excluding said not already admitted task from admission.

38. The device of claim 35 further comprising means for commencing execution of said admitted tasks and, if a previously excluded task again requests admission, again excluding said task unless one of said previously admitted tasks has terminated and the sum of the low use levels of the remaining admitted tasks is small enough that said previously excluded task can be admitted without exceeding the time available on said processor.

39. The device of claim 35 wherein at least one of said admitted tasks has at least three use levels.

40. A processor resource distributor in a computer system which assigns processor time to tasks comprising:

(a) means for receiving for each of two or more tasks requests for processor time, at least one of said requests including specification of two or more levels of processor use for a bi-level task associated with said request, each of said two or more levels specified by a cycle duration for division of real time and, for each cycle duration, specification of a portion of each cycle to be allocated to said bi-level task; and (b) means for allocating processor time to each of said two or more tasks based on said requests and allocating processor time for said bi-level task by selecting one of said specified cycle durations and portions of each cycle.

41. The processor resource distributor of claim 40 wherein each of said two or more levels is associated with a call back function for said bi-level task and said task is called by using the call back function associated with said selected specified cycle duration and portion of each cycle.

42. The processor resource distributor of claim 40 wherein said selection is based on the amount of processor time available and the selected level is the level which is associated with the largest portion of each cycle that can be accommodated within the amount of processor time available.

43. A device in a computer system for adjusting allocation of time on a processor between at least two tasks, comprising:

(a) means for dividing time on said processor into a first series of periods, commencing execution on said processor of a first task, and allocating to said first task a portion of each of said periods of said first series;

(b) means for dividing time on said processor into a second series of periods which may or may not be the same as said first series of periods, commencing execution on said processor of a second task executing at a high level of use during each of said second periods, said high level providing a high quality of performance of said second task, said second task also being capable of executing at a low level of use during said periods of said second series, said low level using less processor time than said high level and providing a lower quality of performance than said high level, and allocating to said second task a portion of each of said periods of said second series; and (c) means for, if said first task requires more processor time in a period of said first series than the processor time allocated to it, switching said second task to its low level of use and reallocating at least a portion of the time on said processor which is thereby made available to said first task.

44. The device of claim 43 wherein the switching of said second task to its low level of use occurs at the end of the then present period of said second series of periods and takes effect for the succeeding period of said second series.

45. The device of claim 43 wherein the determination of whether said first task requires more processor time in a period than the processor time allocated to it is made by prediction based on an estimate of time that the task will require in said period and the switching and reallocating are done before said first task exhausts its allocated time in said period.

46. The device of claim 45 wherein the switching of said second task to its low level of use occurs at the end of the then present period of said second series of periods and takes effect for the succeeding period of said second series.

47. The device of claim 43 further comprising:

(d) means for commencing execution on said processor of a third task executing at a high level of use of time on said processor, said high level providing a high quality of performance for said third task, said third task also being capable of executing at a low level of use of time on said processor, said low level using less processor time than said high level and providing a lower quality of performance than said high level; and, (e) means for switching said second task to its low level of use rather than switching said third task to its low level of use based on a previously made selection that, in the event that said first task requires more processor time than the processor time allocated to it, said second task will be switched to its low use level rather than said third task.

48. A device in a computer system for adjusting use of time on a processor by a task, comprising:

(a) means for dividing time on said processor into a series of periods;

(b) means for commencing execution on said processor of a task executing at a high level of use of time on said processor, said high level providing a high quality of performance of said task, said task also being capable of executing at a low level of use of time on said processor, said low level using less processor time than said high level and providing a lower quality of performance than said high level;

(c) means for allocating to said task a portion of each of said periods; and (d) means for, if said task requires more processor time in a period than the processor time allocated to it, switching said task to its low use level.

49. The device of claim 48 wherein said task is switched to its low use level for the next period.

50. The device of claim 48 wherein the determination that said task will require more processor time in a period than the processor time allocated to it is made by prediction based on an estimate of time that the task will require in said period and the switching is done before said first task exhausts its allocated time in said period.

51. A device in a computer system for adjusting use of time on a processor by a task, comprising:

(a) means for dividing time on said processor into a series of periods;

(b) means for commencing execution on said processor of a first task executing at a high level of use of time on said processor, said high level providing a high quality of performance of said first task, said first task also being capable of executing at a low level of use of time on said processor, said low level using less processor time than said high level and providing a lower quality of performance than said high level;

(c) means for allocating to said first task a portion of each of said periods;

(d) means for commencing execution on said processor of a second task executing at a high level of use of time on said processor, said high level providing a high quality of performance to said second task, said second task also being capable of executing at a low level of use of time on said processor, said low level using less processor time than said high level and providing a lower quality of performance than said high level; and, (e) means for, if said first task requires more processor time in a period than the processor time allocated to it, switching said second task to its low level of use rather than switching said first task to its low level of use based on a previously made selection that, in the event that said first task requires more processor time than the processor time allocated to it, said second task will be switched to its low use level rather than said first task.

* * * * *

UNITED STATES PATENT AND TRADEMARK OFFICE
CERTIFICATE OF CORRECTION

PATENT NO. : 6,385,638 B1
DATED : May 7, 2002
INVENTOR(S) : Miche Baker-Harvey

It is certified that error appears in the above-identified patent and that said Letters Patent is hereby corrected as shown below:

<u>Column 18,</u>
Line 42, the word "is" should be changed to -- first --

Signed and Sealed this

Twenty-second Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,385,638 B1
DATED         : May 7, 2002
INVENTOR(S)   : Miche Baker-Harvey It is certified that error appears in the above-identified patent and that said Letters Patent is hereby corrected as shown below:

<u>Column 18,</u>
Line 42, the word "is" should be changed to -- first --

Signed and Sealed this

Twenty-ninth Day of October, 2002

Attest:

Attesting Officer

JAMES E. ROGAN
Director of the United States Patent and Trademark Office